United States Patent Office 3,553,213
Patented Jan. 5, 1971

3,553,213
17α-AMINOALKYNYL-3-CHLORO
19-NORSTEROIDAL 3,5-DIENES
Donald W. Oliver, King of Prussia, and Gerhard R. Wendt, Havertown, Pa., assignors to American Home Products Corporation, New York, N.Y., a corporation of Delaware
No Drawing. Filed Mar. 17, 1969, Ser. No. 807,978
Int. Cl. C07c 173/10
U.S. Cl. 260—239.5                              30 Claims

ABSTRACT OF THE DISCLOSURE

13 - alkyl - 17α - aminoalkynyl - 3 - chlorogona - 3,5-dien-17-ols and 17-alkanoates (I) and their salts are useful as trichomonacides, fungicides, amebicides and bactericides. Compounds (I) are prepared by treating the corresponding 13 - alkyl - 3 - chloro - 17α - ethynylgona-3,5-dien-17-ol or 17-alkanoate (II) with formaldehyde and an appropriately-substituted secondary amine.

---

This invention is concerned with new 17α-aminoalkynyl-3-chloro 19-norsteroidal 3,5-dienes. The compounds of this invention are biocidally-active, especially against trichomonads, amebae, fungi and bacteria and, in particular, *Staphylococcus aureus*.

Description of the invention.—This invention contemplates compounds of Formula I:

[Structure I: steroid with Cl at 3-position, OR¹ and Y substituents at 17-position]

I wherein R is alkyl of from 1 to 5 carbon atoms; R¹ is hydrogen or alkanoyl of from 2 to 5 carbon atoms; and Y is $$-C\equiv C-CH_2-N\begin{matrix}A\\B\end{matrix}$$

wherein A and B, independently, are alkyl of from 1 to 5 carbon atoms, monophenyl-substituted alkyl of from 1 to 5 carbon atoms or, taken together, form a divalent radical selected from $$-C(R^3)_2(CH_2)_mC(R^3)_2-$$

R³ being hydrogen or methyl and m a whole number of from 2 to 6

$$-CH_2CH_2C(R^4)_2CH_2CH_2-$$

R⁴ being hydrogen, hydroxy, methyl or carboxy, $$-CH_2CH_2N(R^5)CH_2CH_2-$$

R⁵ being selected from alkyl of from 1 to 5 carbon atoms or monohydroxy-substituted alkyl of from 1 to 5 carbon atoms, or $$-CH_2CH_2OCH_2CH_2-$$

and non-toxic, acid-addition salts thereof.

Preferred compounds comprise a subgeneric family of Formula I wherein R is methyl or ethyl, R¹ is hydrogen or acetyl and Y is $$-C\equiv C-CH_2-N\begin{matrix}A\\B\end{matrix}$$

wherein $-N\begin{matrix}A\\B\end{matrix}$ is $-N(CH_3)_2$; $-N(CH_2CH_3)_2$; $-N(CH_2CH_2CH_3)_2$ $-(CH_3)CH_2-$[phenyl]; $-N$[piperidine variants]; $-N$[pyrrolidine]

$-N$[piperidine variants]; $-N$[morpholine rings]; $-N$[azepane variants]

$-N$[piperidine]$-OH$; $-N$[piperidine]$-COOH$; $-N$[morpholine]

$-N$[piperazine]$-N-CH_3$; or $-N$[piperazine]$-N-CH_2CH_2OH$

Special mention is made of a number of particularly valuable embodiments of this invention. These are:

dl - 3 - chloro - 17 - (3 - diethylamino - 1 - propynyl-13-ethylgona-3,5-dien-17β-ol and its hydrochloride, and particularly the enantiomorphs thereof and their hydrochlorides;

dl - 3 - chloro - 13 - ethyl - 17α - [3 - (4 - methyl - 1-piperazinyl)-1-propynyl]-gona-3,5-dien-17-ol and its dihydrochloride, and particularly the enantiomorphs thereof and their hydrochlorides;

3 - chloro - 17α - (3 - dimethylamino - 1 - propynyl)-13-ethylgona-3,5-dien-17-ol and its hydrochloride;

3 - chloro - 13 - ethyl - 17 - [3 - (4 - methyl - 1 - piperazinyl)-1-propynyl]-gona-3,5-dien-17β-ol, acetate and its dihydrochloride;

3 - chloro - 13 - ethyl - 17α - (3 - morpholino - 1 - propynyl)gona-3,5-dien-17β-ol, 17-acetate and its hydrochloride;

3 - chloro - 17 - [3 - (2,2,6,6 - tetramethyl - piperidino)-1-propynyl]-13-ethylgona-3,5-dien-17β-ol and its hydrochloride;

3 - chloro - 13 - ethyl - 17α - [3 - (pyrrolidino) - 1 - propynyl]gona-3,5-dien-17-ol and its hydrochloride.

3 - chloro - 13 - ethyl - 17α - [3 - piperidino - 1 - propynyl]gona-3,5-dien-17-ol and its hydrochloride;

3 - chloro - 17α - [3 - (4,4 - dimethyl - piperidino) - 1-propynyl]-13-ethylgona-3,5-dien-17-ol and its hydrochloride; and 1 - [3 - (3 - chloro - 13 - ethyl - 17β - hydroxygona-3,5-dien-17-yl)-2-propynyl]-isonipecotic acid and its hydrochloride.

When used herein and in the appended claims, the term "alkyl of from 1 to 5 carbon atoms" contemplates lower hydrocarbon radicals, straight chain and branched, including, for example, methyl, ethyl, propyl, butyl and pentyl radicals. The term "alkanoyl of from 2 to 5 carbon atoms" contemplates lower alkanoyl radicals such as acetyl, propionyl, butyryl and pentanoyl. The term "non-toxic, acid-addition salts" contemplates salts of the basic compounds of Formula I. These salts can be used to isolate the compounds and, in addition, are just as useful biocidally as the free bases and in many instances, because of improved solubility characteristics, they lend themselves advantageously to the formulation of a broader range of biocidal compositions. Illustrative of the salt-forming acids contemplated are inorganic acids such as hydrochloric, sulfuric, nitric, phosphoric and the like; and organic acids, such as acetic, malic, citric, aconitic, pamoic, and the like.

The 17α-aminoalkynyl-3-chloro - 19 - norsteroidal 3,5-dienes of Formula I are prepared by treating an appropriately-substituted 3-chloro-17α-ethynyl 19-norsteroidal 3,5-dien-17-ol or alkanoate of Formula II with formaldehyde and an appropriately substituted amine:

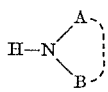

wherein A and B are as above defined, under Mannich condensation conditions, according to the following sequence:

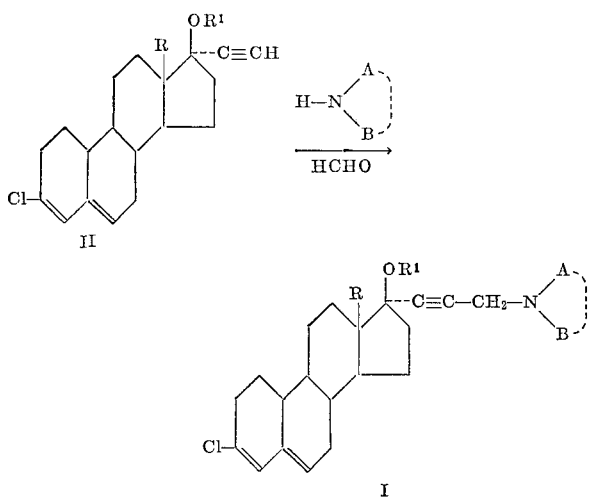

wherein R, $R^1$, A and B are as above defined.

The process is carried out under conditions which are not particularly critical. Those skilled in the art will immediately recognize it to be a type of Mannich reaction. In general, the acetylenic steroid II is suspended in an inert solvent, such as dioxane, and is treated with a mixture of aqueous formaldehyde and the appropriate amine, preferably in the form of an addition salt with an organic acid, such as acetic acid, or an inorganic acid, such as hydrochloric acid. A very small amount of a metal salt catalyst, preferably cuprous chloride, can be added to improve the yield. The reaction is conducted at a temperature of from about 25° C. to about 100° C. and preferably at about 55–75° C. for a period of time long enough to effect the reaction; 20–40 hours at 55–75° C., for example, provides good yields in most cases. The product is recovered in any convenient manner. One means is to pour the mixture into ice and water, render the suspension basic (as with dilute aqueous sodium hydroxide) and extract the basic product with ether. Evaporating the ether leaves the product as a residue. Alternatively, addition of an acid to the ether solution causes precipitation of the product as an acid-addition salt.

Starting materials of Formula II for preparation of the compounds of this invention are available or can be prepared by techniques available to those skilled in the art. One means comprises treating the corresponding 13-alkyl-17α-ethynyl gon-4-en-3-ones of H. Smith, Hughes, Douglas, Wendt, Buzby, Jr., Edgren, Fisher, Foell, Gadsby, Hartley, Herbst, Jansen, Ledig, McLoughlin, McMenamin, Pattison, Phillips, Rees, Siddal, Siuda, L. Smith, Tokolics and Watson, J. Chem. Soc., 1964, 4472–4492 with oxalyl chloride. In one manner of proceeding, a quantity of 1 g. of the 13-alkyl-17α-ethynylgon-4-en-3-one is dissolved in 25 ml. of dry benzene and stirred with 5 ml. of oxalyl chloride and 0.1 g. of oxalic acid for one hour. The organic solvent is evaporated at reduced pressure and the residue taken up in ether, washed with $NaHCO_3$ solution and water. The solvent is dried and evaporated to leave the 13-alkyl-3-chloro-17α-ethynylgona - 3,5 - dien-17-ol (II) as a residue. It may be purified, if desired, by recrystallization from alcohol, methanol or mixtures of methanol and water.

The compounds of Formula I of this invention have been found to possess biocidal properties, mainly in that they are inimical in very small amounts of the order of 7.8–1000 μg./ml. in aqueous media to the growth of fungi, protozoa (trichomonads), bacteria and the like. The instant compounds are thus useful in biocidal compositions in a variety of important fields of use. For example, they can be formulated and used in and fungicidally-trichomonicidally- and bactericidally-active industrial cleaning compositions, and in soaps and detergents intended for veterinary use and in biocidally-active wash solutions to decontaminate premises, pastures, animal cages and the like, which have been infected with microorganisms, particularly of the type mentioned. They will be applied according to end use as powders, solutions, suspensions and the like, containing the active substance generally in concentrations of 0.1% to 0.7% by weight, or even as much as 1%, 1.5%, 1.8% 2% and up to about 5%. In washing solutions for pastures and barns, the active compounds of this invention will be used generally in the range of from about 0.02% to .25% by weight.

Although, in common with most organic substances with relatively high molecular weights, compounds of Formula I have limited solubility in water, those skilled in the art will have no great difficulty in formulating them into a wide variety of biocidally-active compositions. In general, standard techniques can be employed and, where necessary, advantage is taken of the ability of compounds of Formula I to form salts, such as acid-addition salts, which have enhanced solubility in water. The active compounds per se can be made up in dilute aqueous solution. They can, in addition, where required to be made up into more concentrated formulations with solvents such as N,N-dimethylacetamide or ethylene glycol dimethyl ether and the like. They can also be formulated as suspensions or solutions in an aqueous vehicle containing an organic co-solvent, such as for example, N,N-dimethylacetamide or alcohol. Also, aqueous vehicles containing emulsifying agents, such as sodium lauryl sulfate, and relatively high concentrations, e.g., up to about 5% by weight, of the compounds of Formula I can be formulated by conventional techniques.

Illustrative of the biocidal properties of the compounds of this invention are results of tests to determine anti-protozoal, especially trichomonicidal, activity.

A 12.5 mg. portion of test material (as based on active moiety) is added to 2.5 ml. of 1% phosphate buffer, pH 6. Further two-fold dilutions are made in the same buffer. A 1 ml. volume of each dilution is transferred to small sterile screw cap assay tubes containing 3.8 ml. of Diamond medium (formula furnished by American Type Culture Collection, Rockville, Md.) and 0.1 ml. of calf serum. Each assay tube is inoculated with 0.1 ml. of a 48–72 hour culture of *Trichomonas vaginalis* strain ATCC No. 13972. A control assay tube containing no test material is similarly inoculated. The assay tubes are gently shaken and then incubated for 48 hours at 30° C. Following incubation the tubes are gently shaken and with the aid of a Pasteur pipette a drop is deposited on a Spiers-Levy eosinophil counting chamber. The chamber is examined by phase contrast micro-scopy. The number of organisms present in 1 mm.² is multiplied by 5000 in order to express the count per ml. The difference in the number of organisms present in the control tube and in the tubes containing the test material represents the relative potency of the test material and is expressed as the percentage kill at the specific dose level. Metronidazole may be used as a suitable positive control test material.

The results of testing illustrative members of this invention for Trichomonicidal activity are given in the examples hereinafter.

Also illustrative of the biocidal properties of the instant compounds are results of tests to determine antifungal activity, especially against pathogenic fungi, such as *Histoplasma capsulatum*.

A 50 mg. portion of test material is solubilized or suspended in 5 ml. of sterile distilled water. Further two-fold dilutions are made in the same solvent. A 0.2 ml. volume of each dilution is transferred to a sterile stainless steel capped 13 x 100 mm. culture assay tube containing 1.8 ml. of Brain heart infusion fortified with 10% sheep blood; the agar infusion is in a molten stage at 47–48° C. The assay tube contents are well mixed and the agar is allowed to solidify as a slant. Each slant is inoculated with the yeast phase of Histoplasma capsulatum ATCC No. 11407 which has been grown for at least 96 hours in the same medium at 35° C.; the growth of the inoculum slant is suspended in 2 m. sterile distilled water and a drop of the suspension delivered by a Pasteur pipette is used to inoculate each assay tube slant. The assay tubes are incubated for 6 days at 35° C. The assay tube containing the least amount of test material which completely inhibits growth is reported as the minimal inhibitory value and is reported in terms of μg./ml.

The results of testing illustrative members of this invention for antifungal activity are given in the examples hereinafter.

An additional illustration of the biocidal activity of the instant compositions is demonstrated in the results of tests to determine anti-bacterial activity, especially against *Staphylococcus aureus.*

Antibacterial screening is carried out by an agar serial dilution technique. Distilled water is used as a vehicle. The stock solution is prepared at 10,000 μg./ml. of substance in the vehicle. Two-fold dilutions are made in sterile water. One ml. quanitities of each dilution are incorporated in 9 ml. Seed agar in sterile petri dishes. The hardened surface is inoculated with test organisms and incubated 18 hours at 35° C. Spectrum: *B. subtilis* (2 strains), *S. aureus* (3), Mycobacterium sp. *Pseudomonas aeruginosa, E. coli* (2), *S. partyphi, Brucella bronchiseptica, L. casei, S. faecalis.* The endpoint is reported as a minmal inhibitory concentration (MIC) expressed in μg./ml.; the least amount of test substance that will completely inhibit the test organism. The results of testing illustrative members of this invention for antibacterial activity are given in the examples hereinafter.

Antiamebic screening is carried out according to a procedure similar to Thompson, et al., Antibio, and Chem. 6, 337–50 (1956). The test substance is incorporated and diluted in the aqueous phase of a modified Boeck-Drbohlav diphasic medium fortified with rice starch. The medium is inoculated with polybacteria and a known number of trophozoites of *E. histolytica* NIH 200. After 48 hours of incubation at 35° C., the trophozoites are counted. The results are expressed in MIC, defined hereinabove.

In the product of a total synthesis which has not included a suitable resolution stage the compounds prepared by the invention will be present as racemates. Using a convention approved by Fieser and Fieser, "Steroids," p. 336 (1959), the compounds designated as the di-forms are the enantiomers corresponding in configuration to that of the natural hormone estrone. The corresponding enantiomorphs are consequently designated the l-forms and the racemates the dl-forms. Racemates will be depicted by structural formulae which show only the enantiomorphs of the d-configuration. Often, an especially preferred embodiment will comprise either the l-isomer or the d-isomer. For example, d-3-chloro-13-ethyl-17α-[3-(4-methyl-1-piperazinyl)-1-propyl] gona-3,5-dien-17-ol has 130 times the activity against *Endameba histolytica* and 80 times the activity against *Trichomonas vaginalis* shown by the l-enantiomorph; and the l-enantiomorph has 4 times the activity against *Saccharomyces cerevisiae* shown by the dl-racemate and 16 times the activity against *Trichophyton mentagrophytes* shown by the d-form and 130 times shown by the dl-racemate; and the l-enantiomorph has 4 times the activity against *Histoplasma capsulatum* shown by the dl-racemate.

Description of the preferred embodiments.—The following examples show the preparation of a number of compounds within the scope of this invention. They are merely illustrative and are not to be construed to limit the scope of the claims in any manner whatsoever.

EXAMPLE 1 dl-3-chloro-17α-(3-diethylamino-1-propynyl)-13-ethylgona-3,5-dien-17-ol and hydrochloride To a solution of 2.0 g. of dl-3-chloro-13-ethyl-17α-ethynylgona-3,5-dien-17-ol, in 17.5 ml. of dioxane is added 1.3 ml. of water, 0.8 ml. of 40% Formalin solution, 1.3 ml. of acetic acid, 0.65 ml. of diethylamine, and 50 mg. of cuprous chloride. The mixture is stirred at 60° C. under nitrogen for 24 hours. The reaction mixture is then poured into ice-water and basified with 10% NaOH solution. The resulting precipitate is extracted with ether. The combined ether extracts are washed with water, saturated brine solution and then dried ($MgSO_4$). The clear ether filtrate containing the basic form of the product is acidified with isopropanolic·HCl. The resulting precipitate is collected and recrystallized from ether/methanol to obtain 1.07 g. of material identified to be the title compound, M.P. 267.5–269° C. dec.

$$\lambda_{max.}^{KBr}\ 3.15,\ 3.47,\ 3.90,\ 6.20,\ 6.85\mu.$$

*Analysis.*—$C_{26}H_{38}NOCl \cdot HCl$ requires (percent): C, 69.01; H, 8.69; N, 3.09; Cl, 15.67. Found: (percent): C, 68.80; H, 8.78; N, 3.09; Cl. 15.88.

*Trichomonas vaginalis* activity was 97% kill at 6.25 μg./ml.; MIC against *Histoplasma capsulatum* was 125 μg./ml. and antibacterial activity against *B. subtilis* was 7.81 μg./ml. and against *S. aureus* (4 strains) was 7.81, 15.6 and 15.6 μg./ml. resp.

EXAMPLE 2

1-3-chloro-17α-(3-diethylamino-1-propynyl)-13-ethylgona-3,5-diene-17-ol and hydrochloride To a solution of 4.0 g. of 1-3-chloro-13-ethyl-17α-ethynylgona-3,5-dien-17-ol in 35 ml. of dioxane is added 2.6 ml. of water, 1.6 ml. of 40% Formalin solution, 4.0 ml. of acetic acid, 4.0 ml. of diethylamine, and 200 mg. of cuprous chloride. The mixture is stirred at 70° C. for 24 hours under nitrogen, then added to 150 ml. of ice water and basified with 10% sodium hydroxide solution. The resulting precipitate is extracted with chloroform and the combined extracts are filtered, washed with saturate brine solution and dried ($Na_2SO_4$). The mixture is filtered through filter aid, and the chloroform is reduced to a small volume in vacuo. The residue is dissolved in ether, and the clear solution acidified with a 5 N isopropanolic HCl. The resulting precipitate is collected and reprecipitated from methanol-ether to obtain 3.9 g. of product, M.P., 252–260° C., dec., $\lambda_{max}$ 242 mμ ($\epsilon$=20,900), $$[\alpha]_D^{24}+255°$$

(c=1% $CHCl_3$).

*Analysis.*—$C_{26}H_{38}NOCl \cdot HCl$ requires (percent): C, 69.01; H, 8.69; N, 3.09; Cl, 15.67. Found (percent): C, 69.16; H, 8.64; N, 3.12; Cl, 15.88.

EXAMPLE 3 dl-3-chloro-13-ethyl-17α-[3-(4-methyl-1-piperazinyl)-1-propynyl]gona-3,5-dien-17-ol and dihydrochloride To a solution of 2.0 g. of dl-3-chloro-13-ethyl-17α-ethynylgona-3,5-dien-17-ol in 17.5 ml. of dioxane is added 1.3 ml. of water, 0.8 ml. of 40% Formalin solution, 2.6 ml. of acetic acid, 0.7 g. of N-methylpiperazine, and 50 mg. of cuprous chloride. The mixture is stirred under nitrogen at 60° C. for 24 hours. The reaction mixture is then poured into ice-water and basified with 10% NaOH, and the resulting precipitate is extracted with ether. The combined ether extracts are washed with saturated brine solution and dried ($MgSO_4$). The clear ether solution is acidified with isopropanolic·HCl. The product is collected and recrystallized from methanol to obtain 0.4 g. of product, M.P. 260–263° C. dec., $\lambda_{max}^{KBr}$. 3.12, 3.49, 4.20, 6.22, 6.95$\mu$

*Analysis.*—$C_{27}H_{39}N_2OCl \cdot 2HCl$ requires (percent): C, 62.84; H, 8.01; N, 5.43; Cl, 20.61. Found (percent): C, 62.62; H, 7.95; N, 5.42; Cl, 20.54.

*Trichomonas vaginalis* activity was 100% kill at 12.5 $\mu$g./ml.; MIC against *Histoplasma capsulatum* was 62.5 $\mu$g./ml.; and the MIC against *B. subtilis* and 4 strains of *S. Aureus* was 62.5 $\mu$g./ml.

EXAMPLE 4 dl-3-chloro-17$\alpha$-(3-dimethylamino-1-propynyl)-13-ethyl-gona-3,5-dien-17-ol and hydrochloride To a solution of 2.0 g. of dl-3-choloro-13-ethyl-17$\alpha$-ethynylgona-3,5-dien-17-ol in 17.5 ml. of dioxane is added 1.3 ml. of water, 0.8 ml. of 40% Formalin solution, 1.3 ml. of acetic acid, 0.3 g. of dimethylamine and 50 mg. of CuCl. The mixture is stirred at 60° C. under nitrogen for 24 hours. The reaction mixture is then poured into ice-water and basified with 10% NaOH solution. The resulting precipitate is extracted with ether. The combined ether extracts are washed with water and saturated brine solution and then dried ($MgSO_4$). The clear ether filtrate is acidified with isopropanolic·HCl. The product is collected and recrystallized from methanol to obtain 1.1 g. of product, M.P. 278–279° C. dec., $\lambda_{max}^{KBr}$. 3.10, 3.50, 3.92, 6.22, 6.87$\mu$

*Analysis.*—$C_{24}H_{34}NOCl \cdot HCl$ requires (percent): C, 67.91; H, 8.31; N, 3.30; Cl, 16.71. Found (percent): C, 68.06; H, 8.47; N, 3.10; Cl, 16.76.

*Trichomonas vaginalis* activity was 98% kill at 25 $\mu$g./ml.; MIC against *Histoplasma capsulatum* was 62.5 $\mu$g./ml., against *B. subtilis* was 7.81 $\mu$g./ml., against *S. aureus* Smith was 62.5 $\mu$g./ml. and 125 $\mu$g./ml. against three other strains of *S. aureus*.

EXAMPLE 5

1-3-chloro-13-ethyl-17$\alpha$-[3-(4-methyl-1-piperazinyl)-1-propynyl]gona-3,5-dien-17-ol and dihydrochloride A solution of 2.8 g. of 1-3-chloro-13-ethyl-17$\alpha$-ethynylgona-3,5-dien-17-ol, 25 ml. of dioxane, 1.9 ml. of water, 1.15 ml. of Formalin (40%), 2.8 ml. of glacial acetic acid, 2.8 ml. of N-methylpiperazine, and traces of cuprous chloride is stirred for 24 hours at 70° C. (oil heat) under nitrogen. The reaction mixture is poured into water, made basic with diluted sodium hydroxide and the free base extracted with chloroform and filtered through filter aid. The chloroform layer is dried, and the precipitate obtained on addition of isopropanolic hydrochloric acid to the clear solution is dried over $P_2O_5$ at 80° C. to obtain 0.7 g. of the title compound; M.P. 252–254.5° C., $\lambda_{max}$ 242 m$\mu$ (20,600), $\lambda_{max}^{KBr}$. 307, 3.45, 4.15, 6.20$\mu$ $[\alpha]_D$:+193° C. (c=0.9%, 95% EtOH).

*Analysis.*—$C_{27}H_{39}N_2OCl \cdot H_2O$ requires (percent): C, 60.72; H, 8.12; N, 5.25; Cl, 19.92; $H_2O$, 3.37. Found (percent): C, 60.53; H, 7.77; N, 5.46; Cl, 20.34; $H_2O$, 6.44.

MIC against *Saccharomyces cerevisiae* was 7.8 $\mu$g./ml., against *Trichophyton mentagrophytes* was 7.8 $\mu$g./ml., and against *Histoplasma capsulatum* was 31.3 $\mu$g./ml.

EXAMPLE 6 dl-3-chloro-13-ethyl-17$\alpha$-[3 - (4-methyl-1-piperazinyl)-1-propynyl]gona-3,5-dien-17-ol, acetate and hydrochloride.

A suspension of 4.0 g. of dl-3-chloro-13-ethyl-17$\alpha$-ethynylgona-3,5-dien-17-ol, acetate, 35 ml. of dioxane, 2.6 ml. of water, 1.6 ml. of Formaline (40%), 4.0 ml. of acetic acid, 4.0 ml. of N-methylpiperazine, and traces of cuprous chloride is stirred for 24 hours at 70° C. (oil bath) under nitrogen. The reaction mixture is poured into water, made basic with diluted sodium hydroxide and the free base extracted with ether. The precipitate obtained on addition of isopropanolic hydrochloric acid is recrystallized from 20 ml. of methanol to obtain 1.8 g. of the product, M.P. 245–247.5° C. $\lambda_{max}$ 241 m$\mu$ (24,950), $\lambda_{max}^{KBr}$. 2.95, 3.45, 4.25, 5.77, 6.20, 6.90$\mu$

*Analysis.*—$C_{39}H_{41}N_2O_2Cl \cdot 2HCl \cdot \frac{1}{2}H_2O$ requires (percent): C, 61.42; H, 7.82; N, 4.95; Cl, 18.76; $H_2O$, 1.59. Found (percent); C, 61.20; H, 7.62; N, 5.39; Cl, 18.79; $H_2O$, 2.95.

EXAMPLE 7 dl-3-chloro-13-ethyl-17$\alpha$-(3-morpholino-1-propynyl)gona-3,5-dien-17-ol, 17-acetate and hydrochloride To a solution of 1.0 g. of dl-3-chloro-13-ethyl-17$\alpha$-ethynylgona-3,5-dien-17-ol, acetate, in 9 ml. of dioxane is added 0.7 ml. of water, 0.4 ml. of 40% Formalin solution, 1.0 ml. of glacial acetic acid, 1.0 ml. of morpholine, and 50 mg. of cuprous chloride. The solution is stirred and heated to 70° C. under nitrogen for 24 hours. The reaction mixture is then poured into ice-water and basified with 10% NaOH solution. The resulting precipitate is extracted with ether, and the organic layer is washed with saturated brine solution and dried ($MgSO_4$). The clear ether solution is acidified with 5 N isopropanolic·HCl. On standing overnight at 10° C., needles form and they are filtered off and dried over $P_2O_5$ to obtain 0.86 g. of the product, M.P. 203–210° C. dec.; $\lambda_{max}$ 242 m$\mu$ (24,500), $\lambda_{max}^{KBr}$. 3.00, 3.48, 4.80, 5.82, 6.22$\mu$

*Analysis.*—$C_{28}H_{38}NO_3Cl \cdot HCl \cdot \frac{1}{2}H_2O$ requires (percent): C, 64.98; H, 7.79; N, 2.71; Cl, 13.70; $H_2O$, 1.74. Found (percent): C, 65.03; H, 7.70; N, 2.98; Cl, 13.92; $H_2O$, 2.73.

EXAMPLE 8 dl-3-chloro-17$\alpha$-[3-(2,2,6,6 - tetramethylpiperidino)-1-propynyl]-13-ethylgona-3,5-dien-17-ol and hydrochloride A mixture of 1.1 g. of dl-3-chloro-13-ethyl-17$\alpha$-ethynylgona-3,5-dien-17$\beta$-ol, 1.1 ml. of 2,2,6,6-tetramethylpiperidine, 0.2 g. of paraformaldehyde, and 6 ml. of dioxane was stirred and heated to 60° C. under nitrogen for 24 hours. The reaction mixture is then poured into ice water and basified with 10% sodium hydroxide. The resulting precipitate is extracted with ether, and the ether solution is washed with brine, and dried ($MgSO_4$). The clear ether filtrate is acidified with isopropanolic·HCl, and the resulting precipitate is filtered off to obtain 0.8 g. of material. After recrystallizing from methanol-ether and leaching once with water, 0.4 g. of product was obtained M.P. 239–243° C., dec., $\lambda_{max}$ 242 m$\mu$ ($\epsilon$20,000).

*Analysis.*—$C_{31}H_{46}NOCl \cdot HCl$ requires (percent): C, 71.51; H, 9.10; N, 2.69; Cl, 13.62. Found (percent): C, 71.12; H, 9.03; N, 2.72; Cl, 13.61. MIC against *Trichophyton mentagrophytes* was 7.8 $\mu$g./ml., and against *Saccharomyces cerevisiae* was 62.5 $\mu$g./ml.

EXAMPLE 9 d-3-chloro-13-ethyl-17$\alpha$-[3-(4-methyl-1-piperazinyl)-1 propynyl]-gona-3,5-dien-17-ol and dihydrochloride To a solution of 2.5 g. of d-3-chloro-13-ethyl-17-ethynylgona-3,5-dien-17$\beta$-ol in 23 ml. of dioxane is added 1.6 ml. of water, 1.0 ml. of 40% Formalin solution, 1.6 ml. of acetic acid, 0.9 ml. of N-methylpiperazine, and 60 mg. of cuprous chloride. The mixture is stirred and heated to 60–70° C. for 24 hrs. The reaction mixture is then poured into ice water and basified with 10% sodium hydroxide solution. The resulting precipitate is extracted with chloroform. The combined extracts are then washed with saturated brine solution and dried ($Na_2SO_4$). The clear chloroform solution is evaporated to 25 ml. and acidified with isopropanolic·HCl. The resulting precipitate was collected and after reprecipitation from methanol-ether, the product is filtered off and dried over $P_2O_5$ in vacuo to obtain 2.2 g., M.P. 256–260° C., dec., $\lambda_{max}$ 242 mµ (ε20,700), $[\alpha]_D^{24}$ —193° (c=1.0%; 95% EtOH).

Analysis. — $C_{27}H_{39}N_2OCl \cdot 2HCl \cdot H_2O$ requires (percent): C, 60.72; H, 8.12; N, 5.25; Cl, 19.92; $H_2O$, 3.37. Found (percent): C, 60.85; H, 7.77; N, 5.62; Cl, 19.72; $H_2O$, 3.58. MIC against *Endameba histolytica* was 7.8 µg./ml. and against *Trichomonas vaginalis* was 12.5 µg./ml.

EXAMPLE 10 dl-3-chloro-13-ethyl-17α-[3-(pyrrolidino)-1-propynyl] gona-3,5-dien-17-ol and hydrochloride A solution of 3.0 g. of dl-3-chloro-13-ethyl-17α-ethynylgona-3,5-dien-17-ol, 1.95 ml. of water, 1.2 ml. of 40% Formalin, 2.0 ml. of acetic acid, and 1.0 ml. of pyrrolidine in 26.2 ml. of dioxane with 50 mg. of cuprous chloride is heated to about 70° C. and stirred under nitrogen for 24 hours. The mixture is poured into ice-water and basified with 10% sodium hydroxide solution. The resulting precipitate is extracted 3 times with 200 ml. of chloroform, and the combined extracts are washed with saturated brine solution and dried over sodium sulfate. The clear chloroform solution is reduced to a small volume and acidified with isopropanolic·HCl then added to 300 ml. of ether. The resulting colored precipitate is removed by filtering and reprecipitating from methanol-ether. After three reprecipitations from methanol-ether, 0.9 g. of product in the form of an off white powder is obtained, M.P. 275–276° C. with decomposition, $\lambda_{max}$ 242 mµ (ε21,600)

$\lambda_{max}^{KBr}$. 3.05, 3.42, 3.93, 4.06, 6.15µ

Analysis.—$C_{26}H_{36}NOCl \cdot HCl$ requires (percent): C, 69.32; H, 8.28; N, 3.11; Cl, 15.74. Found (percent): C, 69.20; H, 8.18; N, 3.37; Cl, 15.92.

EXAMPLE 11 d-3-chloro-17α-(3-diethylamino-1-propynyl)-13-ethylgona-3,5-dien-17-ol and hydrochloride A solution of 4.0 g. of d-3-chloro-13-ethyl-17α-ethynylgona-3,5-dien-17-ol, 2.6 ml. of water, 1.6 ml. of 40% Formalin, 4.0 ml. of acetic acid, and 4.0 ml. of diethylamine in 35 ml. of dioxane with 200 mg. of cuprous chloride is stirred and heated to 70° C. for 24 hrs. The mixture is added to ice-water and basified with 10% sodium hydroxide solution. The resulting precipitate is extracted with chloroform. A heavy emulsion which forms is removed by filtering the mixture through filter aid and washing well with chloroform. The organic layer is washed with saturated brine solution and dried over sodium sulfate. The clear chloroform solution is reduced to a small volume in vacuo and acidified with isopropanolic·HCl. The resulting precipitate is diluted with ether, and collected by filtering. Recrystallization of the crude material from 150 ml. of 4:11 methanol-ether mixture affords 2.3 g. of crystalline product, M.P. 255–257° C. with decomposition, $\lambda_{max}$ 242 mµ (22,200)

$\lambda_{max}^{KBr}$. 3.10, 3.43, 3.87, 6.18µ

$[\alpha]_D^{24}$—247° (c=1.0%, $CHCl_3$).

Analysis.—$C_{26}H_{38}NOCl \cdot HCl$ requires (percent): C, 69.01; H, 8.69; N, 3.09; Cl, 15.67. Found (percent): C, 68.88; H, 8.57; N, 3.18; Cl, 15.66.

EXAMPLE 12

The procedure of Example 1 is repeated, substituting for diethylamine, appropriately-substituted secondary amines and the following 17α-aminoalkynyl-3-chloro-13-ethylgona-3,5-dien-17-ols are obtained:

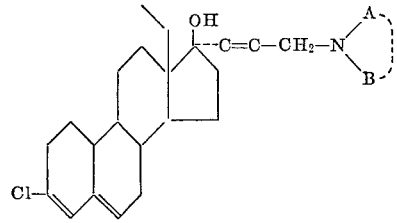

A:
$CH_3CH_2CH_2$
$CH_3$
—$CH_2(CH_2)_3CH_3$
—$CH_3$

B:
$CH_3CH_2CH_2$ $CH_2$—⟨⟩

—$CH_2(CH_2)_3CH_3$

—$CH_2(CH_2)_4$—⟨⟩

A+B:
—$CH_2(CH_2)_4CH_2$—
—$CH_2(CH_2)_5CH_2$—
—$CH_2(CH_2)_6CH_2$—
—$CH_2CH_2CH(OH)CH_2CH_2$—
—$CH_2CH_2N(CH_2CH_2OH)CH_2CH_2$—

EXAMPLE 13 dl-3-chloro-13-ethyl-17-ethynylgona-3,5-dien-17β-ol acetate

A solution of 15.6 g. of dl-3-chloro-13-ethyl-17-ethynyl-gona-3,5-dien-17β-ol in 250 ml. of acetic anhydride, 125 ml. of acetyl chloride, and 12.5 ml. of pyridine is refluxed for two hours. The organic solvent is removed under reduced pressure, and the crystalline residue is recrystallized from methanol to obtain 15.9 g. of material, M.P. 138–141° C. $\lambda_{max}$ 242 mµ (ε 22,300), $\lambda_{max}^{KBr}$. 3.07, 3.44, 5.75, 6.18µ

Analysis.—$C_{23}H_{29}O_2Cl$ requires (percent): C, 74.07; H, 7.83; Cl, 9.51. Found (percent): C, 73.69; H, 7.70; Cl, 9.78.

EXAMPLE 14 d-3-chloro-13-ethyl-17α-ethynylgona-3,5-dien-17-ol acetate

A solution of 5.0 g. of d-3-chloro-13-ethyl-17α-ethynyl-gona-3,5-dien-17-ol in a mixture of 80 ml. of acetic anhydride, 40 ml. of acetyl chloride, and 4 ml. of pyridine is heated to reflux for 2 hours. The organic solvent is evaporated under reduced pressure (0.5 mm.). The residue is crystallized from 50 ml. of methanol to obtain 3.2 g. of white needles M.P. 150–157° C. with softening at 142.5° C., $\lambda_{max}$ 242 mµ (ε=23,600), $\lambda_{max}^{KBr}$. 3.02, 3.39, 3.48, 5.69, 6.18µ, $[\alpha]_D^{24}$—244° (c=1.1%, $CHCl_3$)

Analysis.—$C_{23}H_{29}O_2Cl$ requires (percent): C, 74.07; H, 7.83; Cl, 9.51. Found (percent): C, 73.78; H, 7.49; Cl, 9.48.

EXAMPLE 15 dl-3-chloro-13-ethyl-17α-[3-piperidino-1-propynyl] gona-3,5-dien-17-ol and hydrochloride A solution of 3.0 g. of dl-3-chloro-13-ethyl-17α-ethynyl-gona-3,5-dien-17-ol, 2.0 ml. of water, 1.2 ml. of 40%

11

Formalin, 2.0 ml. of acetic acid, 1.2 ml. of piperidine in 26 ml. of dioxane with 50 mg. of cuprous chloride is heated to 70° C. with stirring for 20 hours under nitrogen. Add the reaction mixture to ice water and basify with 10% sodium hydroxide solution. The resulting precipitate is extracted with chloroform, and the combined organic extracts are washed with saturated brine solution and dried ($Na_2SO_4$). After filtering through filter aid, the clear chloroform solution is evaporated in vacuo to a small volume. Acidification with isopropanolic HCl and dilution with ether affords an off-white precipitate. The material is collected by filtration and reprecipitated from methanol-ether to obtain 1.0 g. of product identified to be the title compound, M.P. 284–285° C. with decomposition, $\lambda_{max}$ 242 m$\mu$ ($\epsilon$=21,700).

*Analysis.*—$C_{27}H_{38}NOCl \cdot HCl$ requires (percent): C, 69.81; H, 8.46; N, 3.02; Cl, 15.26. Found (percent): C, 69.55; H, 8.61; N, 3.12; Cl, 15.04.

EXAMPLE 16 dl-3-chloro-17α-[3-(4,4-dimethylpiperidino)-1-propynyl]-13-ethylgona-3,5-dien-17-ol and hydrochloride A solution of 4.0 g. of dl-3-chloro-13-ethyl-17α-ethynylgona-3,5-dien-17-ol, 2.6 ml. of water, 1.6 ml. of 40% Formalin, 4.0 ml. of acetic acid, and 4.0 ml. of 4,4-dimethylpiperidine in 35 ml. of dioxane with 200 mg. of cuprous chloride is heated to 70° with stirring for 24 hours under nitrogen. The reaction mixture is then added to ice water and basified with 10% sodium hydroxide solution. The resulting precipitate is extracted with ether and the combined extracts are washed with saturated brine solution and dried ($MgSO_4$). The clear ether solution is acidified with 4 N isopropanolic HCl and the resulting precipitate is collected by filtration. The material is recrystallized from MeOH-ether to obtain 3.1 g. of a product identified to be the title compound, M.P. 285–288° C. with decomposition, $\lambda_{max}$ 241 m$\mu$ ($\epsilon$=21,600).

*Analysis.*—$C_{29}H_{42}NOCl \cdot HCl$ requires (percent): C, 70.71; H, 8.80; N, 2.84; Cl, 14.40. Found (percent): C, 71.08; H, 9.16; N, 2.87; Cl, 14.43.

EXAMPLE 17 dl-1-[3-(3-chloro-13-ethyl-17β-hydroxygona-3,5-dien-17-yl)-2-propynyl]-isonipecotic acid and hydrochloride A mixture of 4.0 g. of dl-3-chloro-13-ethyl-17α-ethynylgona-3,5-dien-17-ol, 2.6 ml. of water, 1.6 ml. of 40% Formalin solution, 4.0 ml. of acetic acid and 4.0 g. of isonipecotic acid in 35 ml. of dioxane with 200 mg. of cuprous chloride is stirred and heated to 70° C. under nitrogen for 24 hours. The reaction mixture is then added to ice water. The solid material is collected by filtration, dried over $P_2O_5$ and suspended in methanol. The suspension is treated with 4 N isopropanolic HCl, and the resulting solution is evaporated under reduced pressure to a small volume until the product begins to crystallize. The mixture is diluted with ether, and the material is collected by filtration. Two recrystallizations from methanol-ether afford 0.6 g. of material identified to be the title compound, M.P. 254–257° C. with decomposition, $\lambda_{max}$ 241 m$\mu$ ($\epsilon$=21,200).

*Analysis.*—$C_{28}H_{38}NO_3Cl \cdot HCl$ requires (percent): C, 66.13; H, 7.73; N, 2.75; Cl, 13.94. Found (percent): C, 66.40; H, 7.95; N, 2.61; Cl, 13.78.

EXAMPLE 18

The procedure of Example 1 is repeated, substituting for the dl-3-chloro-13-ethylgona-17α-ethynyl-3,5-dien-17-ol, appropriately substituted 13-alkyl-3-chloro-17α- ethynylgona-3,5-dien-17-ols or alkanoates and the following

12

13-alkyl - 3 - chloro-17α-(3-diethylamino - 1 - propynyl) gona-3,5-dien-17-ols and alkanoates are obtained:

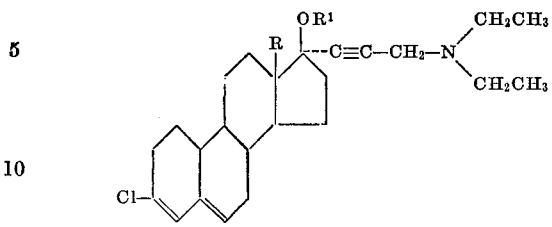

R:

$CH_3$
$CH_3CH_2$
$CH_2(CH_2)_3CH_3$
$(CH_3)_2CH$
$CH_3CH_2$ $R^1$:

H
$COCH_3$
H
H
$COCH_2(CH_2)_2CH_3$

EXAMPLE 19

The sulfuric, nitric, phosphoric, acetic, malic, citric, aconitic and pamoic acid addition salts of 3-chloro-17α-(3-diethylamino - 1 - propynyl)-13-ethylgona-3,5-dien-17-ol (Example 1) are prepared by treating the clear ether filtrate containing the basic form of the product with stoichiometric amounts of the respective acids in isopropanol, then evaporating the solvents, leaving the addition salt as a residue.

To further illustrate their biocidal activity, the following compounds had the indicated MIC against *Endameba histolytica*:

3-chloro-17α-(3-diethylamino - 1 - propynyl)-13-ethylgona-3,5-dien-17-ol, hydrochloride, 1,000 $\mu$g./ml.;

3-chloro-13-ethyl-17α-[3-(4-methyl - 1 - piperazinyl)- 1 - propynyl]gona-3,5-dien-17-ol, dihydrochloride, 1,000 $\mu$g./ml.;

3 - chloro-17α-(3-dimethylamino - 1 - propynyl)-13-ethylgona-3,5-dien-17-ol, hydrochloride, 1,000 $\mu$g./ml.;

3-chloro-13-ethyl-17α-[3-(4-methyl - 1 - piperazinyl)-1-propynyl]gona-3,5-dien-17-ol, 17-acetate, dihydrochloride, 31.3 $\mu$g./ml.;

3 - chloro-17α-[3-(4,4-dimethylpiperidino) - 1 - propynyl]-13-ethylgona-3,5-dien-17-ol, hydrochloride, 1,000 $\mu$g./ml.; and 1-[3-(3-chloro-13-ethyl-17β-hydroxygona - 3,5 - dien-17-yl)-2-propynyl]isonipecotic acid, hydrochloride, 250 $\mu$g./ml.

We claim:
1. A compound selected from those of the formula

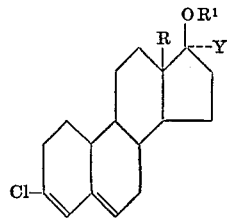

wherein R is alkyl of from 1 to 5 carbon atoms; $R^1$ is hydrogen or alkanoyl of from 2 to 5 carbon atoms; and Y is

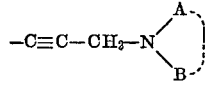

wherein A and B, independently, are alkyl of from 1 to 5 carbon atoms, monophenyl-substituted alkyl of from 1 to 5 carbon atoms or, taken together, form a divalent radical selected from

$R^3$ being hydrogen or methyl and $m$ a whole number of from 2 to 6,

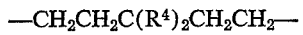

$R^4$ being hydrogen, hydroxy, methyl or carboxy,

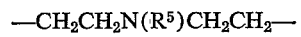

$R^5$ being selected from alkyl of from 1 to 5 carbon atoms or monohydroxy-substituted alkyl of from 1 to 5 carbon atoms, or

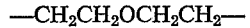

and non-toxic, acid-addition salts thereof.

2. A compound as defined in claim 1 wherein R is methyl or ethyl, $R^1$ is hydrogen or acetyl and Y is

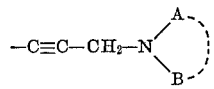

wherein

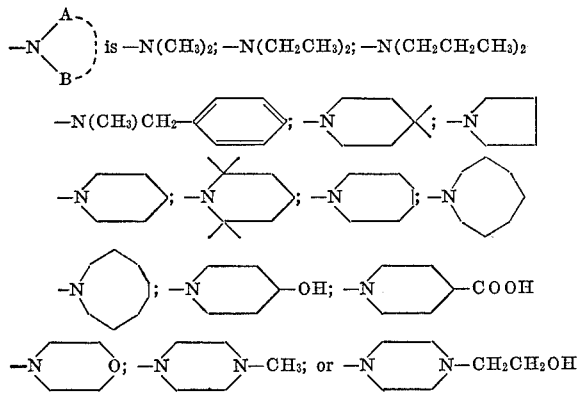

3. A compound as defined in claim 1 which is 3-chloro-17α-(3 - diethylamino - 1 - propynyl) - 13 - ethylgona-3,5-dien-17-ol.

4. A compound as defined in claim 3 in the form of a hydrochloric acid addition salt.

5. A compound as defined in claim 3 in the form of a l-enantiomorph, substantially free of the d-enantiomorph.

6. A compound as defined in claim 5 in the form of a hydrochloric acid addition salt.

7. A compound as defined in claim 1 which is 3-chloro-13-ethyl-17α-[3 - (4 - methyl - 1 - piperazinyl)-1-propynyl]gona-3,5-dien-17-ol.

8. A compound as defined in claim 7 in the form of a dihydrochloric acid addition salt.

9. A compound as defined in claim 1 which is 3-chloro-17α-(3 - dimethylamino - 1 - propynyl)-13-ethylgona-3,5-dien-17-ol.

10. A compound as defined in claim 9 in the form of a hydrochloric acid addition salt.

11. A compound as defined in claim 7 in the form of a l-enantiomorph, substantially free of the d-enantiomorph.

12. A compound as defined in claim 11 in the form of a dihydrochloric acid addition salt.

13. A compound as defined in claim 1 which is 3-chloro-13-ethyl-17α-[3-(4 - methyl - 1 - piperazinyl)-1-propynyl]gona-3,5-dien-17-ol, acetate.

14. A compound as defined in claim 13 in the form of a dihydrochloric acid addition salt.

15. A compound as defined in claim 1 which is 3-chloro-13-ethyl-17α-(3-morpholino - 1 - propynyl)gona-3,5-dien-17ol, 17-acetate.

16. A compound as defined in claim 15 in the form of a hydrochloric acid addition salt.

17. A compound as defined in claim 1 which is 3 - chloro - 17α - [3-(2,2,6,6-tetramethylpiperidino)-1-propynyl]-13-ethylgona-3,5-dien-17-ol.

18. A compound as defined in claim 17 in the form of a hydrochloric acid addition salt.

19. A compound as defined in claim 7 in the form of a d-enantiomorph, substantially free of the l-enantiomorph.

20. A compound as defined in claim 19 in the form of a dihydrochloric acid addition salt.

21. A compound as defined in claim 1 which is 3-chloro - 13 - ethyl - 17α - [3-(pyrrolidino)-1-propynyl]gona-3,5-dien-17-ol.

22. A compound as defined in claim 21 in the form of a hydrochloric acid addition salt.

23. A compound as defined in claim 3 in the form of a d-enantiomorph, substantially free of a l-enantiomorph.

24. A compound as defined in claim 23 in the form of a hydrochloric acid addition salt.

25. A compound as defined in claim 1 which is 3 - chloro - 13 - ethyl-17α-[3-piperidino-1-propynyl]gona-3,5-dien-17-ol.

26. A compound as defined in claim 25 in the form of a hydrochloric acid addition salt.

27. A compound as defined in claim 1 which is 3-chloro-17α-[3-(4,4-dimethylpiperidino) - 1 - propynyl]-13-ethylgona-3,5-dien-17-ol.

28. A compound as defined in claim 27 in the form of a hydrochloric acid addition salt.

29. A compound as defined in claim 1 which is 1-[3-(3-chloro-13-ethyl - 17β - hydroxygona-3,5-dien-17-yl)-2-propynyl]-isonipecotic acid.

30. A compound as defined in claim 29 in the form of a hydrochloric acid addition salt.

References Cited

UNITED STATES PATENTS 3,264,330   8/1966   Moersch et al.
3,285,939   11/1966  Moersch et al.

HENRY A. FRENCH, Primary Examiner

U.S. Cl. X.R.

260—239.55, 397.5, 999